(12) United States Patent
Minamikawa

(10) Patent No.: US 7,943,539 B2
(45) Date of Patent: May 17, 2011

(54) GLASS-CERAMICS AND METHOD FOR MANUFACTURING THE SAME

(75) Inventor: Hiroyuki Minamikawa, Machida (JP)

(73) Assignee: Kabushiki Kaisha Ohara, Sagamihara-shi (JP)

( * ) Notice: Subject to any disclaimer, the term of this patent is extended or adjusted under 35 U.S.C. 154(b) by 74 days.

(21) Appl. No.: 11/815,082

(22) PCT Filed: Jan. 26, 2006

(86) PCT No.: PCT/JP2006/301713
§ 371 (c)(1),
(2), (4) Date: Jul. 30, 2007

(87) PCT Pub. No.: WO2006/080557
PCT Pub. Date: Aug. 3, 2006

(65) Prior Publication Data
US 2009/0042710 A1 Feb. 12, 2009

(30) Foreign Application Priority Data
Jan. 31, 2005 (JP) .................. 2005-023756

(51) Int. Cl.
*C03C 10/14* (2006.01)
*C03C 10/12* (2006.01)
(52) U.S. Cl. .............................. 501/4; 501/7
(58) Field of Classification Search .............. 501/4, 7
See application file for complete search history.

(56) References Cited

U.S. PATENT DOCUMENTS

| | | |
|---|---|---|
| 3,977,886 A | 8/1976 | Muller |
| 4,009,042 A | 2/1977 | Rittler |
| 5,591,682 A | 1/1997 | Goto |
| 6,060,412 A * | 5/2000 | Ishida ............... 501/4 |
| 6,492,288 B2 * | 12/2002 | Shindo .............. 501/4 |
| 6,689,704 B2 * | 2/2004 | Ota et al. ........... 501/7 |
| 6,750,167 B2 * | 6/2004 | Kitamura et al. .... 501/4 |
| 7,226,881 B2 * | 6/2007 | Goto ................ 501/4 |

FOREIGN PATENT DOCUMENTS

| | | |
|---|---|---|
| EP | 0 587 979 A1 | 3/1993 |
| EP | 1 291 328 A2 | 3/2003 |
| EP | 1 391 438 A1 | 2/2004 |
| JP | 11292616 * | 10/1999 |
| JP | 2001052334 * | 2/2001 |
| JP | 2004-131371 A | 4/2004 |
| JP | 2004-131372 A | 4/2004 |

OTHER PUBLICATIONS

International Search Report of PCT/JP2006/301713, date of mailing, Apr. 24, 2006.

\* cited by examiner

*Primary Examiner* — Karl E Group
(74) *Attorney, Agent, or Firm* — Westerman, Hattori, Daniels & Adrian, LLP

(57) ABSTRACT

There are provided glass-ceramics comprising, in mass %, 50-60% $SiO_2$, 22-26% $Al_2O_3$ and 3-5% $Li_2O$, having an average crystal grain diameter exceeding 100 nm, and having an average linear thermal expansion coefficient of $30 \times 10^{-7}$/° C. or below within a temperature range of 0° C. to 50° C. These glass-ceramics are manufactured by a step of melting glass raw materials, a step of forming the molten glass, a step of annealing the formed glass, a first heat treating step for heat treating the annealed glass at a temperature of 650-750° C. for 0.1 hour to 200 hours, and a second heat treating step for heat treating the glass at a temperature of 800-1000° C. for 0.1 hour to 50 hours.

19 Claims, No Drawings

GLASS-CERAMICS AND METHOD FOR MANUFACTURING THE SAME

TECHNICAL FIELD

This invention relates to glass-ceramics having an opaque or white color and excellent light diffusing property and glass-ceramics products utilizing the glass-ceramics. The invention relates also to a method for manufacturing the glass-ceramics.

BACKGROUND ART

Resins and glasses are used generally for light diffusing plates. For obtaining a light diffusing plate from these materials, an opaque polycarbonate resin, for example, having a light diffusing property in itself is used. Alternatively, a light diffusing property is imparted to a material by processing the surface of the material by acid treatment or sand blasting. Alternatively further, a film having a light diffusing function or an opaque film is provided on a substrate made of a resin or glass.

These materials, however, have a high average linear thermal expansion coefficient. As to glasses, high thermal expansion glasses called a blue plate and a white plate are generally used. When such materials having a high average linear thermal expansion coefficient are used in an environment which undergoes a significant temperature change, there arises the problem that Haze value cannot be maintained at a constant value due to expansion of the material.

These materials, therefore, have sufficient performances as a light diffusing plate when it is used for ordinary measuring instruments but are not suitable for a light diffusing plate of a measuring instrument used for measuring diffusing light accurately in an environment which undergoes a significant temperature change.

Even in an environment in which the temperature is constant, in case laser beam, for example, is used as the light source of diffusing light, the temperature of a light diffusing plate is elevated resulting in instability in Haze value. There is also a problem of damage to a light diffusing plate due to thermal shock caused by laser irradiation.

As a substrate for a magnetic information recording medium, several types of glass-ceramics having a small average linear thermal expansion coefficient have been proposed by, for example, Japanese Patent Application Laid-open Publication Nos. 2002-284544, 2002-308647 and Hei 11-314939. In these glass-ceramics, however, a crystal grain diameter of precipitating crystals is a small one of 0.1 μm or below and therefore the light diffusing property of these glass-ceramics is generally poor.

Japanese Patent Application Laid-open Publication No. 2004-131372 discloses lithium aluminosilicate glass-ceramics. The glass-ceramics have a large average linear thermal expansion coefficient within a range from $15 \times 10^{-7}/°C$. to $30 \times 10^{-7}/°C$. within a temperature range of 20-700° C. and therefore have an instable Haze value in an environment which undergoes a temperature change.

Japanese Patent Application Laid-open Publication No. Hei 7-172862 discloses glass-ceramics which have a low average linear thermal expansion coefficient within a range from $-1 \times 10^{-6} K^{-1}$ to $+2 \times 10^{-6} K^{-1}$ within a temperature range of $-50-700°$ C. The glass-ceramics, however, contain $Na_2O$ or $K_2O$ and, when a film is formed on a substrate made of the glass-ceramics, the movable alkali components solve out of the substrate with lapse of time and contaminate the film.

It is, therefore, an object of the invention to provide glass-ceramics which have a low thermal expansion property with little expansion and contraction against change in the temperature and therefore have a stable haze value and an excellent light diffusing property and exhibit an opaque or white color.

It is another object of the invention to provide glass-ceramics elements using the glass-ceramics.

It is another object of the invention to provide a method for manufacturing the glass-ceramics.

It is still another object of the invention to reduce solving out of alkali components with lapse of time.

SUMMARY OF THE INVENTION

Studies and experiments made by the inventor of the present invention for achieving the above objects of the invention have resulted in the finding, which has led to the present invention, that, by causing a specific crystal phase to precipitate by a composition within a specific composition range and thereby causing the glass-ceramics to have a specific average crystal grain diameter and a specific average linear thermal expansion coefficient, opaque or white glass-ceramics which are suitable for a light diffusing plate can be obtained and glass-ceramics elements using these glass-ceramics and a method for manufacturing the glass-ceramics can also be obtained.

According to the first aspect of the invention, there are provided glass-ceramics comprising, in mass %,

| | |
|---|---|
| $SiO_2$ | 50-60% |
| $Al_2O_3$ | 22-26% |
| $Li_2O$ | 3-5%, | having an average crystal grain diameter exceeding 100 nm, and having an average linear thermal expansion coefficient of $30 \times 10^{-7}/°C$. or below within a temperature range of 0° C. to 50° C.

According to the invention, low thermal expansion glass-ceramics having an excellent light diffusing property and exhibiting an opaque or white color can be obtained.

The glass-ceramics of the present invention have a very high heat resistance temperature and can maintain their shape and strength at a high temperature of 800° C. or over and can stand a high temperature up to 1000° C.

In the second aspect of the invention, there are provided glass-ceramics as defined in the first aspect comprising $P_2O_5$ in an amount of 5-10 mass %, $SiO_2+P_2O_5$ being 55-70 mass %, and the ratio of $P_2O_5$ to $SiO_2$ in mass being 0.08 to 0.20.

In the third aspect of the invention, there are provided glass-ceramics as defined in the first or second aspect comprising, in mass %,

| | |
|---|---|
| $TiO_2$ | 1-4% and/or |
| $ZrO_2$ | 1-4%. |

In the fourth aspect of the invention, there are provided glass-ceramics as defined in any of the first to the third aspects comprising, in mass %,

| | |
|---|---|
| MgO | 0.6-2% and/or |
| ZnO | 0.1-2% and/or |
| CaO | 0.3-4% and/or |
| BaO | 0.5-4%. |

In the fifth aspect of the invention, there are provided glass-ceramics as defined in any of the first to the fourth aspects comprising $As_2O_3$ in an amount of 0-2 mass %.

In the sixth aspect of the invention, there are provided glass-ceramics as defined in any of the first to the fifth aspects comprising, in mass %,

| | |
|---|---|
| $SiO_2$ | 50-62% |
| $P_2O_5$ | 5-10% |
| $Al_2O_3$ | 22-26% |
| $Li_2O$ | 3-5% |
| MgO | 0.6-2% |
| ZnO | 0.1-2% |
| CaO | 0.3-4% |
| BaO | 0.5-4% |
| $TiO_2$ | 1-4% |
| $ZrO_2$ | 1-4% |
| $As_2O_3$ | 0-2%, | where $SiO_2+P_2O_5$ is 55-70 mass % and the ratio $P_2O_5/SiO_2$ in mass is 0.08-0.20.

In the seventh aspect of the invention, there are provided glass-ceramics comprising, in mol %,

| | |
|---|---|
| $SiO_2$ | 55-70% |
| $Al_2O_3$ | 10-25% |
| $Li_2O$ | 5-15%, | having an average crystal grain diameter exceeding 100 nm, and having an average linear thermal expansion coefficient of $30 \times 10^{-7}/° C$. or below within a temperature range of 0° C. to 50° C.

In the eighth aspect of the invention, there are provided glass-ceramics as defined in the seventh aspect comprising $P_2O_5$ in an amount of 2-8 mol %, $SiO_2+P2O_5$ being 57-78 mol %, and the molar ratio of $P_2O_5$ to $SiO_2$ being 0.02 to 0.15.

In the ninth aspect of the invention, there are provided glass-ceramics as defined in the seventh or the eighth aspect comprising, in mol %,

| | |
|---|---|
| $TiO_2$ | 1-4% and/or |
| $ZrO_2$ | 0.5-3%. |

In the tenth aspect of the invention, there are provided glass-ceramics as defined in any of the seventh to the ninth aspects comprising, in mol %,

| | |
|---|---|
| MgO | 0.5-5% and/or |
| ZnO | 0.05-2% and/or |
| CaO | 0.3-7% and/or |
| BaO | 0.3-4%. |

In the eleventh aspect of the invention, there are provided glass-ceramics as defined in any of the seventh to the tenth aspects comprising $As_2O_3$ in an amount of 0-1 mol %.

In the twelfth aspect of the invention, there are provided glass-ceramics as defined in any of the seventh to the eleventh aspects comprising, in mol %,

| | |
|---|---|
| $SiO_2$ | 55-70% |
| $P_2O_5$ | 2-8% |
| $Al_2O_3$ | 10-25% |
| $Li_2O$ | 5-15% |
| MgO | 0.5-5% |
| ZnO | 0.05-2% |
| CaO | 0.3-7% |
| BaO | 0.3-4% |
| $TiO_2$ | 1-4% |
| $ZrO_2$ | 0.5-3% |
| $As_2O_3$ | 0-1%, | where $SiO_2+P_2O$, is 57-78 mol % and the molar ratio $P_2O_5/SiO_2$ is 0.02-0.15.

In the thirteenth aspect of the invention, there are provided glass-ceramics as defined in any of the first to the twelfth aspects wherein the average linear thermal expansion coefficient is within a range from $-5 \times 10^{-7}/° C$. to $30 \times 10^{-7}/° C$. within a temperature range of 0° C. to 50° C.

In the fourteenth aspect of the invention, there are provided glass-ceramics as defined in any of the first to the thirteenth aspects wherein the mass ratio (MgO+ZnO)/(MgO+ZnO+CaO+BaO) is less than 1.

In the fifteenth aspects of the invention, there are provided glass-ceramics as defined in any of the first to the fourteenth aspects comprising β-spodumene and/or β-spodumene solid solution.

In the sixteenth aspect of the invention, there are provided glass-ceramics as defined in any of the first to the fifteenth aspects which is substantially free of $Na_2O$ and $K_2O$.

In the seventeenth aspect of the invention, there are provided glass-ceramics as defined in any of the first to the sixteenth aspects which is substantially free of F component.

In the eighteenth aspect of the invention, there are provided glass-ceramics as defined in any of the first to the seventeenth aspects obtained by melting glass raw materials to glass, forming and annealing the glass, and thereafter heat treating the glass for crystallization at a nucleating temperature of 650-750° C. for 0.1 hour to 200 hours and at a crystallizing temperature of 800-1000° C. for 0.1 hour to 50 hours.

In the nineteenth aspect of the invention, there are provided glass-ceramics as defined in any of the first to the eighteenth aspects obtained by melting glass raw materials to glass, forming and annealing the glass, and thereafter heat treating the glass, for crystallization, at a nucleating temperature of 650-750° C. for 0.1 hour to 200 hours and at a crystallizing temperature of 750-800° C. for 0.1 hour to 50 hours and, after cooling the product to room temperature, further heat treating the product at a temperature of 800-1000° C. for 0.1 hour to 50 hours.

In the twentieth aspect of the invention, there is provided a light diffusing element made of the glass-ceramics as defined in any of the first to the nineteenth aspects.

In the twenty-first aspect of the invention, there is provided a light diffusing element as defined in the twentieth aspect having a haze value to light C of 0.1% or over at thickness of 0.1 mm.

In the twenty-second aspect of the invention, there is provided a mold for molding glass, plastic or resin made of the glass-ceramics as defined in any of the first to the nineteenth aspects.

In the twenty-third aspect of the invention, there is provided an optical mirror element made of the glass-ceramics as defined in any of the first to the nineteenth aspects.

In the twenty-fourth aspect of the invention, there is provided a platen for a precision machine made of the glass-ceramics as defined in any of the first to the nineteenth aspects.

In the twenty-fifth aspect of the invention, there is provided a building material made of the glass-ceramics as defined in any of the first to the nineteenth aspects.

In the twenty-sixth aspect of the invention, there is provided a decorative material made of the glass-ceramics as defined in any the first to the nineteenth aspects.

In the twenty-seventh aspect of the invention, there is provided a method for manufacturing glass-ceramics comprising:

a step of melting glass raw materials;
a step of forming the molten glass;
a step of annealing the formed glass;
a first heat treating step for heat treating the annealed glass at a temperature of 650-750° C. for 0.1 hour to 200 hours; and
a second heat treating step for heat treating the glass at a temperature of 800-1000° C. for 0.1 hour. to 50 hours.

In the twenty-eighth aspect of the invention, there is provided a method for manufacturing glass-ceramics comprising:

a step of melting glass raw materials;
a step of forming the molten glass;
a step of annealing the formed glass;
a first heat treating step for heat treating the annealed glass at a temperature of 650-750° C. for 0.1 hour to 200 hours;
a second heat treating step for heat treating the glass at a temperature of 750-800° C. for 0.1 hour to 50 hours; and
a step of cooling the product of the second heat treatment to room temperature; and
a third heat treating step for heat treating the cooled product at a temperature of 800-1000° C. for 0.1 hour to 50 hours.

In the twenty-ninth aspect of the invention, there is provided a method for manufacturing glass-ceramics as defined in the twenty-seventh or twenty-eighth aspect wherein composition of the glass raw materials on oxide basis comprises, in mass %,

| | |
|---|---|
| $SiO_2$ | 50-62% |
| $P_2O_5$ | 5-10% |
| $Al_2O_3$ | 22-26% |
| $Li_2O$ | 3-5% |
| MgO | 0.6-2% |
| ZnO | 0.1-2% |
| CaO | 0.3-4% |
| BaO | 0.5-4% |
| $TiO_2$ | 1-4% |
| $ZrO_2$ | 1-4% |
| $As_2O_3$ | 0-2%, | where $SiO_2+P_2O_5$ is 55-70 mass % and the ratio $P_2O_5/SiO_2$ in mass is 0.08-0.20.

In the thirtieth aspect of the invention, there is provided a method for manufacturing glass-ceramics as defined in the twenty-seventh or twenty-eights aspect wherein composition of the glass raw materials on oxide basis comprises, in mol %,

| | |
|---|---|
| $SiO_2$ | 55-70% |
| $P_2O_5$ | 2-8% |
| $Al_2O_3$ | 10-25% |
| $Li_2O$ | 5-15% |
| MgO | 0.5-5% |
| ZnO | 0.05-2% |
| CaO | 0.3-7% |
| BaO | 0.3-4% |
| $TiO_2$ | 1-4% |
| $ZrO_2$ | 0.5-3% |
| $As_2O_3$ | 0-1%, | where $SiO_2+P_2O_5$ is 57-78 mol % and the molar ratio $P_2O_5/SiO_2$ is 0.02-0.15.

In the thirty-first aspect of the invention, there is provided a method for manufacturing glass-ceramics as defined in any of the twenty-seventh to the thirtieth aspects wherein the mass ratio (MgO+ZnO)/(MgO+ZnO+CaO+BaO) of MgO, ZnO, CaO and BaO contained in the glass raw materials on oxide basis is less than 1.

In the thirty-second aspect of the invention, there are provided glass-ceramics as defined in any of the first to the nineteenth aspects having Vickers hardness of 650 or over.

DESCRIPTION OF PREFERRED EMBODIMENTS

Description of preferred embodiments of the invention will now be described.

For achieving an excellent light diffusing property, the average crystal grain diameter of the crystal phase of the glass-ceramics of the present invention should preferably exceed 100 nm, more preferably be 200 nm or over and, most preferably exceed 300 nm. If, however, the average crystal grain diameter is excessively large, the light transmittance is deteriorated and the average linear thermal expansion coefficient becomes large. For this reason, the average crystal grain diameter should preferably be 2000 nm or below, more preferably be 1500 nm and, most preferably be 1000 nm or below.

For achieving stability in size against temperature change, and for reducing change in light diffusing property due to temperature change, the average linear thermal expansion coefficient of the glass-ceramics of the present invention should preferably be $30 \times 10^{-7}/°$ C. or below, more preferably be less than $15 \times 10^{-7}/°$ C. and, most preferably be less than $10 \times 10^{-7}/°$ C. within a temperature range of 0-50° C. For the same reason, the lower limit of the average linear thermal expansion coefficient should preferably be $5 \times 10^{-7}/°$ C., more preferably be $-3 \times 10^{-7}/°$ C. and, most preferably be $-0.1 \times 10^{-7}/°$ C. within a temperature range of 0-50° C.

For the same reason, the average linear thermal expansion coefficient of the glass-ceramics of the present invention should preferably be less than $15 \times 10^{-7}/°$ C. or below, more preferably be less than $10 \times 10^{-7}/°$ C. and, most preferably be less than $5 \times 10^{-7}/°$ C. within a temperature range of 20-700° C. The lower limit of the average linear thermal expansion coefficient should preferably be $-5 \times 10^{-7}/°$ C., more preferably be $-3 \times 10^{-7}/°$ C. and, most preferably be $-1 \times 10^{-7}/°$ C. within a temperature range of 20-700° C.

Since the glass-ceramics are materials in which a crystal phase precipitates in a glass phase, anisotropy in linear thermal expansion coefficient which occurs, for example, in an injection-molded resin product does not exist or, even if it exists, is of a negligibly small value in the glass-ceramics.

The glass-ceramics of the present invention comprise, as a predominant crystal phase, β-spodumene (β-$Li_2O.Al_2O_3.SiO_2$) and/or β-spodumene solid solution (β-$Li_2O .Al_2O_3.SiO_2$ solid solution). By comprising such crystal phase the glass-ceramics of the present invention can have an average crystal grain diameter necessary for realizing desired light diffusing property and also can have a desired average linear thermal expansion property.

There is a case where, in addition to these crystal phases, the glass-ceramics preferably comprise β-quartz (β-$SiO_2$) and/or β-quartz solid solution (β-$SiO_2$ solid solution). β-quartz (β-$SiO_2$) and β-quartz solid solution (β-$SiO_2$ solid solution) are crystals which have a negative thermal expansion coefficient and, in some cases; a desired average linear thermal expansion coefficient can be realized by a combination of these crystals phases, β-spodumene and/or β-spodumene solid solution and a glass phase.

In the present invention, β-quartz solid solution may include, in its definition, β-eucryptite (β-$Li_2O.Al_2O_3.2SiO_2$) and/or β-eucryptite solid solution in which MgO, ZnO etc. are mixed with β-eucryptite.

Description will now be made about respective components which the glass-ceramics of the present invention comprise. Unless otherwise mentioned, amounts of the respective components are expressed in mass %.

$SiO_2$ is a very important component for precipitation of the desired crystal phase of the glass-ceramics of the present invention by heat treatment of a base glass. If the amount of this component is less than 50%, the obtained crystal becomes instable and excessively grown crystal grains are in places produced with the result that the light diffusing property is deteriorated. The amount of this component should preferably be 50% or over, more preferably be 51% or over and, most preferably be 52% or over.

If the amount of this component exceeds 62%, difficulty arises in melting and refining of the base glass with resulting deterioration in optical homogeneity of the product. The amount of this component therefore should be 62% or below, more preferably be 61% or below and, most preferably be 60% or below.

In this specification, light diffusing property means a property which is evaluated comprehensively when the glass-ceramics of the present invention are used as a light diffusing element and this property includes haze value (diffusion transmittance÷parallel light transmittance×100) and uniformity of diffusing light (i.e., there is no irregularity in diffusing light).

$Al_2O_3$ is a very important component for precipitation of the desired crystal phase of the glass-ceramics of the present invention by heat treatment of a base glass. If the amount of this component is less than 22%, melting of the base glass becomes difficult. The amount of this component should preferably be 22% or over, more preferably be 22.5% or over and, most preferably be 23% or over.

If the amount of this component exceeds 26%, difficulty arises in melting of the base. The amount of this component therefore should be 26% or below, more preferably be 25.5% or below and, most preferably be 25% or below.

$Li_2O$ is a very important component for precipitation of the desired crystal phase of the glass-ceramics of the present invention by heat treatment of a base glass. If the amount of this component is less than 3%, the melting property of the base glass is deteriorated with resulting deterioration in homogeneity of the product. The amount of this component should preferably be 3% or over, more preferably be 3.2% or over and, most preferably be 3.4% or over.

If the amount of this component exceeds 5%, excessively grown crystal grains are in places produced with resulting deterioration in the light diffusing property. The amount of this component therefore should be 5% or below, more preferably be 4.8% or below and, most preferably be 4.6% or below.

$P_2O_5$ is effective for improving melting property and refining property of the base glass when it coexists with $SiO_2$. If the amount of this component is less than 5%, this effect cannot be achieved. The amount of this component should preferably be 5% or over, more preferably be 5.5% or over and, most preferably be 6% or over.

If the amount of this component exceeds 10%, resistance to devitrification of the, base glass is deteriorated and, as a result, an excellent light diffusing property of the glass-ceramics cannot be achieved. The amount of this component therefore should be 10% or below, more preferably be 9.5% or below and, most preferably be 9.0% or below.

For obtaining particularly satisfactory achievement of these effects, the total amount of $SiO_2$ and $P_2O_5$ should preferably be 55-70% and more preferably be 58-69% and the ratio in mass of $P_2O_5/SiO_2$ should preferably be 0.08-0.2 and more preferably be 0.1-0.18.

$TiO_2$ and $ZrO_2$ should preferably be added as nucleating agents. The amount of each of these components should preferably be 1% or over, for it tends to produce the desired crystal phase and, more preferably be 1.2% or over and, most preferably be 1.4% or over. The amount of each of these components should be 4% or below, for resistance to devitrification of the base glass thereby improves and, more preferably be 3.5% or below and, most preferably be 3% or below.

MgO and ZnO are known to be constituents of β-quartz solid solution and β-spodumene solid solution and, by adding these components, a low thermal expansion property which enables the amount of change in relative length to be reduced over a wide temperature range can be realized. These components therefore should preferably be added.

If the amount of MgO is less than 0.6%, the above effect cannot be achieved but the melting property of the base glass is deteriorated with resulting deterioration in homogeneity of the product. The amount of this component should preferably be 0.6% or over, more preferably be 0.7% or over and, most preferably be 0.8% or over.

If the amount of this component exceeds 2%, the above effect cannot be achieved but precipitation of the desired crystal phase becomes difficult. The amount of this component should preferably be 2% or below, more preferably be 1.4% or below and, most preferably be 1.3% or below.

If the amount of ZnO is less than 0.1%, the above effect cannot be achieved but the melting property of the base glass is deteriorated with resulting deterioration in homogeneity of the product. The amount of this component should preferably be 0.1% or over, more preferably be 0.2% or over and, most preferably be 0.5% or over.

If the amount of this component exceeds 2%, the above effect cannot be achieved but resistance to devitrification of the base glass is deteriorated and precipitation of the desired crystal phase becomes difficult. The amount of this component should preferably be 2% or below, more preferably be 1.5% or below and, most preferably be 1.2% or below.

CaO and BaO are components which remain as a glass matrix phase in the produced glass-ceramics and these components should preferably be added for finely adjusting the ratio between the glass-ceramics phase and the glass matrix phase.

If the amount of CaO is less than 0.3%, the above fine adjustment effect can hardly be achieved. The amount of this component should preferably be 0.3% or over, more preferably be 0.4% or over and, most preferably be 0.5% or over.

If the amount of this component exceeds 4%, resistance to devitrification of the base glass is deteriorated. The amount of this component should preferably be 4% or below, more preferably be 3% or below and, most preferably be 2.5% or below.

If the amount of BaO is less than 0.5%, the above fine adjustment effect can hardly be achieved. The amount of this component should preferably be 0.5% or over, more preferably be 0.6% or over and, most preferably be 0.7% or over.

If the amount of this component exceeds 4%, resistance to devitrification and melting property of the base glass are deteriorated. The amount of this component should preferably be 4% or below, more preferably be 3% or below and, most preferably be 2.5% or below.

$As_2O_3$ may be added as a refining agent in melting the base glass for obtaining a homogeneous product. Addition of this component in an amount of 2% or below will suffice.

Preferable amount ranges of the respective components of the glass-ceramics of the invention will be expressed in mol % below. Reasons for critical limits of the respective components are the same as those described above with respect to the respective components expressed in mass %.

The amount of $SiO_2$ should preferably be 55 mol % or over, more preferably be 56 mol % or over and, most preferably be 57 mol % or over.

The amount of this component should preferably be 70 mol % or below, more preferably be 69 mol % or below and, most preferably be 68 mol,% or below.

The amount of $Al_2O_3$ should preferably be 10 mol % or over, more preferably be 11 mol % or over and, most preferably be 12 mol % or over.

The amount of this component should preferably be 25 mol % or below, more preferably be 24 mol % or below and, most preferably be 23 mol % or below.

The amount of $Li_2O$ should preferably be 5 mol % or over, more preferably be 6 mol % or over and, most preferably be 7 mol % or over.

The amount of this component should preferably be 15 mol % or below, more preferably be 14.5 mol % or below and, most preferably be 14 mol % or below.

The amount of $P_2O_5$ should preferably be 2 mol % or over, more preferably be 2.1 mol % or over and, most preferably be 2.2 mol % or over.

The amount of this component should preferably be 8 mol % or below, more preferably be 7 mol % or below and, most preferably be 6.5 mol % or below.

The total amount of $SiO_2$ and $P_2O_5$ should preferably be 57-78 mol % and more preferably be 59-75% and the molar ratio of $P_2O_5/SiO_2$ should preferably be 0.02-0.15 and more preferably be 0.03-0.14.

The amount of $TiO_2$ should preferably be 1 mol % or over, more preferably be 1.2 mol % or over and, most preferably be 1.4 mol % or over.

The amount of this component should preferably be 4 mol % or below, more preferably be 3.8 mol % or below and, most preferably be 3.5 mol % or below.

The amount of $ZrO_2$ should preferably be 0.5 mol % or over, more preferably be 0.6 mol % or over and, most preferably be 0.7 mol % or over.

The amount of this component should preferably be 3 mol % or below, more preferably be 2.8 mol % or below and, most preferably be 2.5 mol % or below.

The amount of MgO should preferably be 0.5 mol % or over, more preferably be 0.6 mol % or over and, most preferably be 0.7 mol % or over.

The amount of this component should preferably be 5 mol % or below, more preferably be 4.5 mol % or below and, most preferably be 4 mol % or below.

The amount of ZnO should preferably be 0.05 mol % or over, more preferably be 0.2 mol % or over and, most preferably be 0.3 mol % or over.

The amount of this component should preferably be 2 mol % or below, more preferably be 1.8 mol % or below and, most preferably be 1.6 mol % or below.

The amount of CaO should preferably be 0.3 mol % or over, more preferably be 0.4 mol % or over and, most preferably be 0.5 mol % or over.

The amount of this component should preferably be 7 mol % or below, more preferably be 3.5 mol % or below and, most preferably be 3.0 mol % or below.

The amount of BaO should preferably be 0.3 mol % or over more preferably be 0.35 mol % or over and, most preferably be 0.4 mol % or over.

The amount of this component should preferably be 4 mol % or below, more preferably be 3.5 mol % or below and, most preferably be 3 mol % or below.

When $As_2O_3$ is added, the amount of 1 mol % or below will suffice.

When the ratio in mass of MgO, ZnO, CaO and BaO, i.e., (MgO+ZnO)/(MgO+ZnO+CaO+BaO), is less than 1, stability of the base glass before crystallization is high and balance of crystal composition during crystallization thereby is improved and a low thermal expansion property can be realized. Further, when no alkali metal oxide other than $Li_2O$ is introduced in the glass and MgO, ZnO, CaO and BaO are introduced with the ratio in mass of (MgO+ZnO)/(MgO+ZnO+CaO+BaO) being less than 1, excellent durability and weather-proof property can be realized.

For achieving these effects more sufficiently, the value of (MgO+ZnO)/(MgO+ZnO+CaO+BaO) should more preferably be 0.9 or below and, most preferably be 0.8 or below.

If alkali metal oxides other than $Li_2O$, particularly $Na_2O$ and $K_2O$, are contained in glass-ceramics, these components do not constitute crystals but remain in glass matrix and, therefore, can move easily in the glass-ceramics. As time elapses, these alkali components are diffused and solve out of the glass-ceramics and, in a case where such glass-ceramics are used as a substrate and a film is formed on the glass-ceramics substrate, the solving out alkali components contaminate the film.

Since the glass-ceramics of the present invention can have a stable composition without these alkali components, the glass-ceramics of the present invention are substantially free of alkali metal oxides other than $Li_2O$, particularly $Na_2O$ and $K_2O$.

Since F component tends to be evaporated during melting of the base glass and thereby contaminate the atmosphere, the glass-ceramics of the present invention are substantially free of F component.

In this specification, "being substantially free of a particular component" means that the particular component is not intentionally added and excludes a case where a very small amount of the particular component is mixed unintentionally as impurity.

Since V, Cr, Mn, Fe, Co, Ni and Cu tend to color the glass-ceramics, these components should not preferably be added if coloring of the glass-ceramics should be avoided.

Description will now be made about a method for manufacturing the glass-ceramics of the present invention.

Starting raw materials of carbonates, oxides etc. are weighed and mixed to constitute the above described composition on oxide basis The mixture is put in a platinum crucible and melted at a temperature within a range from 1300° C. to 1700° C. The molten glass is formed and annealed and then the annealed glass is subjected to a first heat treatment for nucleation at a temperature within a range from 650° C. to 750° C. for 0.1. hour to 200 hours, preferably 10 to 200 hours. After the first heat treatment, the glass is subjected to a second heat treatment for crystallization at a temperature within a range from 800° C. to 1000° C. for 0.1 hour to 50 hours, preferably 5 hours to 50 hours.

In the second heat treatment, it is preferable to apply heat treatment at a temperature of 800° C. or over for a sufficient time period so that the average crystal grain diameter increases to exceed 100 nm.

The glass-ceramics of the present invention can be obtained by the above described method. Alternatively, the glass-ceramics of the present invention may be obtained by subjecting, after the first heat treatment, the glass to a second heat treatment for crystallization at a temperature within a range from 750° C. to 800° C. for 0.1 hour to 50 hours, preferably 5 hours to 50 hours, and then, after cooling the product of the second heat treatment to room temperature, subjecting the product to a third heat treatment for further crystallization at a temperature within a range from 800° C. to 1000° C. for 0.1 hour to 50 hours, preferably 5 hours to 50 hours.

In the third heat treatment, it is preferable to apply heat treatment at a temperature of 800° C. or over for a sufficient time period so that the average crystal grain diameter increases to exceed 100 nm.

The glass-ceramics of the present invention have a high hardness. Vickers hardness of the glass-ceramics of the present invention is 650 or over. As the temperature of the second heat treatment or the third heat treatment becomes high, Vickers hardness also tends to become high and, therefore, by controlling the temperature of the heat treatment, Vickers hardness of 700 or over or even 710 or over can be achieved. The upper limit of Vickers hardness is 800.

Vickers hardness in the present invention was measured under measuring conditions of test piece load of 2.94N, load speed of 30 μm/sec and holding time of 15 sec and, as other measuring conditions, conditions stipulated in JISZ 2244.

According to the invention, low thermal expansion glass-ceramics having an excellent light diffusing property and exhibiting an opaque or white color, glass-ceramics elements using the glass-ceramics and also a method for manufacturing the glass-ceramics can be obtained.

The glass-ceramics of the present invention have a very high heat resistance temperature and can maintain their shape and strength at a high temperature of 800° C. or over and can stand a high temperature up to 1000° C.

EXAMPLES

Examples of the present invention will now be described. It should be noted that the present invention is in no way restricted by these examples. Examples of the present invention were prepared by melting raw materials of the compositions shown in Table 1 at a temperature within a range from 1400° C. to 1600° C., forming the melt to glass and annealing the glass and then subjecting the glass to heating at a temperature within a range from 650° C. to 750° C. for nucleation and further heating it at a temperature within a range from 800° C. to 1000° C. for crystallization. Details of the conditions for crystallization of the respective examples are shown in Table 1.

Composition, predominant crystal phases; average linear thermal expansion coefficient within a temperature range of 0° C. to 50° C., average linear thermal expansion coefficient within a temperature range of 20°0 C. to 700° C., average crystal grain diameter of the predominant crystal phases and haze values to light C at thickness of 0.1 mm of the respective examples are shown in Table 1. In Table 1, β-quartz solid solution is abbreviated as β-quartz S.S.

TABLE 1

| Composition | Examples | | | |
|---|---|---|---|---|
| (mass %) | 1 | 2 | 3 | 4 |
| $SiO_2$ | 55.0 | 55.0 | 54.5 | 56.0 |
| $P_2O_5$ | 7.5 | 8.0 | 8.0 | 7.5 |
| $GeO_2$ | 0.5 | — | 0.5 | — |
| $Al_2O_3$ | 24.0 | 24.0 | 24.5 | 24.0 |
| MgO | 0.5 | 1.0 | 1.0 | 0.5 |
| BaO | 1.0 | 1.0 | 0.5 | 0.5 |
| CaO | 1.0 | 1.0 | 0.5 | 1.0 |
| ZnO | 1.0 | 0.5 | 0.5 | 0.5 |
| $Li_2O$ | 3.5 | 4.0 | 4.5 | 4.5 |
| $TiO_2$ | 3.0 | 2.5 | 3.0 | 2.5 |
| $ZrO_2$ | 2.0 | 2.0 | 1.5 | 2.0 |
| $As_2O_3$ | 1.0 | 1.0 | 1.0 | 1.0 |
| Average linear thermal expansion coefficient ($\times 10^{-7}$/° C.) (0-50° C.) | 0 | 10 | 7 | 12 |
| Average linear thermal expansion coefficient ($\times 10^{-7}$/° C.) (20-700° C.) | 1 | 9 | 7 | 14 |
| Average crystal grain diameter (nm) | 100 | 300 | 500 | 700 |
| Predominant crystal phase | β-quartz S.S. | β-quartz S.S. + β-spodumene | β-quartz S.S. + β-spodumene | β-quartz S.S. + β-spodumene |
| Crystallization conditions | 700° C. 40 h 800° C. 40 h | 700° C. 40 h 780° C. 40 h 850° C. 10 h | 700° C. 40 h 900° C. 1 h | 700° C. 40 h 770° C. 50 h 1000° C. 1 h |

TABLE 1-continued

| Composition | Examples | | | |
|---|---|---|---|---|
| (mass %) | 1 | 2 | 3 | 4 |
| Haze value (%) (test piece thickness) | 0.1 (0.1 mmt) | 6.5 (0.1 mmt) | 23.0 (0.1 mmt) | 91.9 (0.1 mmt) |

Table 2 shows Vickers hardness of Example Nos. 5-7 of the glass-ceramics of the present invention which were prepared by crystallizing the base glass having the same composition as Example No. 2 shown in, Table 1 by variously changing the heat treatment conditions for crystallization.

TABLE 2

| | Examples | | |
|---|---|---|---|
| | 5 | 6 | 7 |
| Crsytallization conditions | 700° C. 40 h 780° C. 40 h ° C. 850° C. 10 h | 700° C. 40 h 770° C. 40 h 900° C. 10 h | 700° C. 40 h 950° C. 10 h |
| Vickers hardness | 720 | 730 | 750 |

INDUSTRIAL APPLICABILITY

The glass-ceramics of the present invention have an excellent light diffusing property and, therefore, are suitable for use as light diffusing elements. More specifically, they are suitable for use as transmitting type light diffusing elements which diffuse transmitting light and also reflecting type light diffusing elements which diffuse reflected light.

For achieving excellent light diffusion, haze value to light C of the light diffusing elements using the glass-ceramics of the present invention should preferably be 0.1% or over, more preferably 1% or over and most preferably 5% or over at thickness of 0.1 mm.

Haze value meaning, as described above, diffusion transmittance÷parallel light transmittance×100 is measured in the following manner.

For measuring Haze value, a test piece in the form of a sheet having size of 20×20×0.1 mm is prepared and is optically polished on both surfaces. Whether or not optical polishing has been performed satisfactorily can be reaeily confirmed by observing whether or not there is a sandy portion on the polished surface. The polished test piece is rinsed and then Haze value is measured by using Haze meter HGM-2DP made by Suga Shikenki Kabushiki Kaisha.

In the present specification, "light C" means light from standard source C stipulated by Commission Internationale de l'Eclairage (CIE). This light has a color temperature of 6740° K and can be provided by applying a specific filter to a tungsten lamp which is lighted under a specific condition. This light corresponds to daylight including light of blue sky.

Since the glass-ceramics of the present invention have high heat resistance and a small average linear thermal expansion coefficient, the glass-ceramics can be used for producing a mold for molding glass, plastic or resin, an optical mirror element, a palten for a precision machine, a building material and a decorative material.

These elements and materials may be produced from the glass-ceramics of the present invention only and also may be produced by forming a film on a substrate made of the glass-ceramics or combining the glass-ceramics with other material. Forming of a film means forming a new layer on the surface of the glass-ceramics by, for example, deposition, (physical deposition or chemical vapor deposition), plating (electroplating, electroless plating, hot dipping etc.), painting, coating and printing. For forming a metal layer or a metal oxide layer on the surface, physical deposition, chemical vapor deposition, flame spray coating or plating, for example, may be employed. As physical deposition, vacuum deposition, sputtering or ion plating, for example, may be applied. As chemical vapor deposition (CVD), thermal CVD, plasma CVD or light CVD, for example, may be applied. As flame spray coating, atmospheric pressure plasma flame spray or reduced pressure plasma flame spray, for example, may be applied. As plating, electroless plating (chemical plating), hot dipping or electroplating, for example, may be applied. As electroplating, laser plating, for example, may be applied. Since the glass-ceramics of the present invention are completely or substantially free from contamination by solving out of alkali components, the glass-ceramics are suitable for application of such film forming methods.

The invention claimed is:

1. A light diffusing element having a Haze value to light C of 0.1% or over at thickness of 0.1 mm and consisting of glass-ceramics comprising, in mass %,

| | |
|---|---|
| $SiO_2$ | 50-62%, |
| $P_2O_5$ | 5-10%, |
| $Al_2O_3$ | 22-26%, and |
| $Li_2O$ | 3.2-5%, | wherein the ratio $P_2O_5/SiO_2$ in mass is 0.1-0.20,
having an average crystal grain diameter exceeding 100 nm, and having an average linear thermal expansion coefficient of $30\times10^{-7}/°$ C. or below within a temperature range of 0° C. to 50° C.

2. A light diffusing element as defined in claim 1, wherein $SiO_2 + P_2O_5$ is 55-70 mass %.

3. A light diffusing element as defined in claim 1 or 2, wherein said glass-ceramics comprise, in mass %,

| | |
|---|---|
| $TiO_2$ | 1-4%, and/or |
| $ZrO_2$ | 1-4%. |

4. A light diffusing element as defined in claim 1, wherein said glass-ceramics further comprise, in mass %, one or more compounds selected from

| | |
|---|---|
| MgO | 0.6-2%, |
| ZnO | 0.1-2%, |
| CaO | 0.3-4%, and |
| BaO | 0.5-4%. |

5. A light diffusing element as defined in claim 1, wherein said glass-ceramics comprise $As_2O_3$ in an amount of 0-2 mass %.

6. A light diffusing element as defined in claim 1, wherein said glass-ceramics comprise, in mass %,

| | |
|---|---|
| $SiO_2$ | 50-62%, |
| $P_2O_5$ | 5-10%, |
| $Al_2O_3$ | 22-26%, |
| $Li_2O$ | 3.2-5%, |
| MgO | 0.6-2%, |
| ZnO | 0.1-2%, |
| CaO | 0.3-4%, |
| BaO | 0.5-4%, |
| $TiO_2$ | 1-4%, |
| $ZrO_2$ | 1-4%, and |
| $As_2O_3$ | 0-2%, | where $SiO_2+P_2O_5$ is 55-70 mass % and the ratio $P_2O_5/SiO_2$ in mass is 0.1-0.20.

7. A light diffusing element having a Haze value to light C of 0.1% or over at thickness of 0.1 mm and consisting of glass-ceramics comprising, in mol %,

| | |
|---|---|
| $SiO_2$ | 55-70%, |
| $P_2O_5$ | 2-8%, |
| $Al_2O_3$ | 10-25%, and |
| $Li_2O$ | 6-15%, | wherein the ratio $P_2O_5/SiO_2$ in mol is 0.03-0.14,
having an average crystal grain diameter exceeding 100 nm, and having an average linear thermal expansion coefficient of $30\times10^{-7}/°$ C. or below within a temperature range of 0° C. to 50° C.

8. A light diffusing element as defined in claim 7, wherein said glass-ceramics further, in mol %,

| | |
|---|---|
| $TiO_2$ | 1-4%, and/or |
| $ZrO_2$ | 0.5-3%. |

9. A light diffusing element as defined in claim 7, wherein said glass-ceramics comprise, in mol %, one or more compound selected from

| | |
|---|---|
| MgO | 0.5-5%, |
| ZnO | 0.05-2%, |
| CaO | 0.3-7%, and |
| BaO | 0.3-4%. |

10. A light diffusing element as defined in claim 7, wherein said glass-ceramics comprise $As_2O_3$ in an amount of 0-1 mol %.

11. A light diffusing element as defined in claim 7, wherein said glass-ceramics comprise, in mol %,

| | |
|---|---|
| $SiO_2$ | 55-70%, |
| $P_2O_5$ | 2-8%, |
| $Al_2O_3$ | 10-25%, |
| $Li_2O$ | 6-15%, |
| MgO | 0.5-5%, |
| ZnO | 0.05-2%, |
| CaO | 0.3-7%, |
| BaO | 0.3-4%, |
| $TiO_2$ | 1-4%, |
| $ZrO_2$ | 0.5-3%, and |
| $As_2O_3$ | 0-1%, | where $SiO_2+P_2O_5$ is 57-78 mol % and the molar ratio $P_2O_5/SiO_2$ is 0.03-0.14.

12. A light diffusing element as defined in claim 1 or 7, wherein the average linear thermal expansion coefficient is within a range from $-5\times10^{-7}/°$ C. to $30\times10^{-7}/°$ C. within a temperature range of 0° C. to 50° C.

13. A light diffusing element as defined in claim 1 or 7, wherein the mass ratio (MgO +ZnO)/(MgO +ZnO +CaO +BaO) is less than 1.

14. A light diffusing element as defined in claim 1 or 7, comprising β-spodumene and/or β-spodumene solid solution.

15. A light diffusing element as defined in claim 1 or 7, wherein said glass-ceramics are free of $Na_2O$ and $K_2O$.

16. A light diffusing element as defined in claim 1 or 7, wherein said glass-ceramics are free of F component.

17. A light diffusing element as defined in claim 1 or 7, wherein said glass-ceramics are obtained by melting glass raw materials to glass, forming and annealing the glass, and thereafter heat treating the glass for crystallization at a nucleating temperature of 650-750° C. for 0.1 hour to 200 hours and at a crystallizing temperature of 800-1000° C. for 0.1 hour to 50 hours.

18. A light diffusing element as defined in claim 1 or 7, wherein said glass-ceramics are obtained by melting glass raw materials to glass, forming and annealing the glass, and thereafter heat treating the glass, for crystallization, at a nucleating temperature of 650-750° C. for 0.1 hour to 200 hours and at a crystallizing temperature of 750-800° C. for 0.1 hour to 50 hours and, after cooling the product to room temperature, further heat treating the product at a temperature of 800-1000° C. for 0.1 hour to 50 hours.

19. A light diffusing element as defined in claim 1 or 7 wherein said glass-ceramics have Vickers hardness of 650 or over.

\* \* \* \* \*